US006981696B2

(12) United States Patent
Hatano et al.

(10) Patent No.: US 6,981,696 B2
(45) Date of Patent: Jan. 3, 2006

(54) FLUID-FILLED CYLINDRICAL VIBRATION DAMPING DEVICE

(75) Inventors: Motohiro Hatano, Konan (JP); Jyoji Tsutsumida, Komaki (JP)

(73) Assignee: Tokai Rubber Industries, LTD, Komaki (JP)

( * ) Notice: Subject to any disclaimer, the term of this patent is extended or adjusted under 35 U.S.C. 154(b) by 0 days.

(21) Appl. No.: 10/613,651

(22) Filed: Jul. 2, 2003

(65) Prior Publication Data

US 2004/0004317 A1    Jan. 8, 2004

(30) Foreign Application Priority Data

Jul. 4, 2002    (JP) .............................. 2002-195699

(51) Int. Cl.
*F16F 13/00*    (2006.01)
(52) U.S. Cl. .............................................. 267/140.12
(58) Field of Classification Search . 267/140.11–141.7
See application file for complete search history.

(56) References Cited

U.S. PATENT DOCUMENTS

| 4,936,556 | A | | 6/1990 | Makibayashi et al. | |
|---|---|---|---|---|---|
| 5,439,203 | A | * | 8/1995 | Hadano | 267/140.12 |
| 5,595,373 | A | * | 1/1997 | Ikeda | 267/140.12 |
| 5,690,320 | A | * | 11/1997 | Kanda | 267/140.12 |
| 6,029,961 | A | | 2/2000 | Meyerink et al. | |

FOREIGN PATENT DOCUMENTS

| JP | 2-66743 | 5/1990 |
|---|---|---|
| JP | 6-22642 | 3/1994 |
| JP | 7-88866 | 9/1995 |
| JP | 8-152041 | 6/1996 |
| JP | 8-170686 | 7/1996 |
| JP | 9-229128 | 9/1997 |
| JP | 10-132016 | 5/1998 |
| JP | 11-101295 | 4/1999 |

* cited by examiner

*Primary Examiner*—Christopher P. Schwartz
(74) *Attorney, Agent, or Firm*—Beyer Weaver & Thomas LLP

(57) ABSTRACT

A fluid-filled cylindrical vibration-damping device wherein an inner and an outer sleeve are elastically connected together at their axially upper ends by an elastic body, at their axially lower ends by a flexible layer, and at their axially intermediate portions by a flexible partition. A pressure-receiving chamber partially defined by the elastic body and an equilibrium chamber partially defined by the flexible layer are disposed on opposite sides of the flexible partition, and are held in fluid communication through an orifice passage defined by an orifice defining member attached to an axially intermediate portion of an inner circumferential surface of the outer sleeve. The flexible partition includes a cylindrical portion extending axially upwardly from an inner peripheral portion of the orifice defining member and an annular curved portion extending radially inwardly from the upper end of the cylindrical portion to be fixed to the inner sleeve.

9 Claims, 3 Drawing Sheets

FLUID-FILLED CYLINDRICAL VIBRATION DAMPING DEVICE

INCORPORATED BY REFERENCE

The disclosure of Japanese Patent Application No. 2002-195699 filed on Jul. 4, 2002 including the specification, drawings and abstract is incorporated herein by reference in its entirety.

BACKGROUND OF THE INVENTION

1. Field of the Invention

The present invention relates generally to a fluid-filled vibration-damping device of overall generally cylindrical shape, which is capable of exhibiting vibration-damping effect with respect to vibrations applied thereto primarily in an axial direction thereof on the basis of flows of a non-compressible fluid filled therein. More specifically, the present invention is concerned with such a fluid filled cylindrical vibration-damping device that is novel in construction and applicable to a variety of mounts for automotive vehicles including an engine mount, a body mount, a member mount, a carburetor mount and a strut-bar cushion, for example.

2. Description of the Related Art

A cylindrical vibration-damping device, which includes mutually connected inner shaft member and outer sleeve member via a rubber elastic body, is widely known as one type of a vibration-damping coupling or mount adapted to be installed between two members of a vibration systems so as to elastically connect or support the two members in a vibration-damping fashion. Further, JP-B-7-88866 or JP-A-8-152041 discloses a known example of a fluid-filled cylindrical vibration-damping device that is capable of exhibiting vibration-damping effect with respect to vibrations applied thereto primarily in its axial direction with the help of flows of a non-compressible fluid sealed therein. In the known fluid-filled cylindrical vibration-damping device disclosed in these publication documents, the inner shaft member and the outer sleeve member are elastically connected together at one axial end portions thereof via the elastic body, at the other axial end portions thereof via an flexible layer, and at axially intermediate portions thereof via a rubber partition. Accordingly, the fluid-filled cylindrical vibration-damping device includes a pressure-receiving chamber partially defined by the elastic body and an equilibrium chamber partially defined by the flexible layer, which are formed on axially opposite sides of the rubber partition. These pressure-receiving and equilibrium chambers are both filled with a non-compressible fluid, and are mutually held in fluid communication via an orifice passage.

When the known fluid-filled cylindrical vibration-damping device is subjected to vibrations applied thereto in its axial direction, a relative fluid pressure variation is induced between the pressure-receiving chamber and the equilibrium chamber, causing flows of the fluid through the orifice passages due to fluid pressure differences between the pressure-receiving chamber and the equilibrium chamber.

Meanwhile, the known fluid-filled cylindrical vibration-damping device as disclosed in the above described documents, has suffered from difficulty in obtaining a sufficient amount of fluid flows between the pressure-receiving chamber and the equilibrium chamber through the orifice passage, when subjected to vibration application in its axial direction. As a result, the known fluid-filled cylindrical vibration-damping device is still insufficient in exhibiting vibration-damping effect on the basis of flows of the fluid.

To cope with such a drawback, it has been proposed, as disclosed in JP-A-8-170686, JP-A-9-229128 and JP-A-10-132016, for example, not to be bonded one of the inner and outer peripehral portions of the rubber partition to the inner shaft member or the outer sleeve member so that the peripheral portion of the rubber partition become axially slidable. However, such a non-bonded peripheral portion of the rubber partition with respect to the inner shaft member or the outer sleeve member may cause insufficient fluid tight sealing and durability at the peripheral portion of the rubber portion. This may possibly create a short passage or undesirable fluid communication between the pressure-receiving chamber and the equilibrium chamber through the interface between the non-bonded peripheral portion of the rubber partition and the inner shaft member or the outer sleeve member, resulting in deterioration in vibration-damping effect of the device.

Besides, JP-U-6-22642 has proposed to give a butt like shape to the rubber partition so that the rubber partition extends in an axial direction of the device with a cylindrical shape having an axially intermediate portion that largely expands radially outwardly with an arc shape. However, the proposed rubber partition of butt like shape is simply bent and extended to undergo extension and compression deformation in the axial direction, when being subjected to an axial vibrational load. Therefore, the fluid-filled cylindrical vibration-damping device disclosed in JP-U-6-22642 still suffers from difficulty in generating a sufficient amount of relative pressure variation between the pressure-receiving chamber and the equilibrium chamber. In addition, the rubber partition largely expands into the pressure-receiving chamber, making it difficult for the pressure-receiving chamber to have a sufficient amount of volume. This causes deterioration in vibration-damping capability of the device, especially for vibrations having a relatively large amplitude or stroke.

SUMMARY OF THE INVENTION

It is therefore one object of this invention to provide a fluid-filled cylindrical vibration-damping device of improved construction that effectively ensures a desired amount of fluid flows through an orifice passage upon application of a vibrational load to the device during vibration input in an axial direction of the device, thereby exhibiting a further improved vibration-damping effect on the basis of flows of the fluid through the orifice passage.

The above and/or optional objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

(1) A fluid-filled cylindrical vibration-damping device comprising: (a) an inner shaft member; (b) an outer sleeve member disposed radially outwardly of the inner shaft member with a spacing therebetween; (c) an elastic body disposed between and elastically connecting one axial end portions of the inner shaft member and the outer sleeve member; (d) a flexible layer disposed between and elastically connecting other axial end portions of the inner shaft member and the outer sleeve member at other axial end portions thereof; (e) a flexible partition disposed between and elastically connecting axially intermediate portions of the inner shaft member and the outer sleeve member at axially intermediate portions thereof; (f) a pressure-receiving chamber partially defined by the elastic body and disposed on one of axially opposite sides of the flexible partition, the pressure-receiving chamber being filled with a non-compressible fluid whose pressure varies upon application of an axial vibrational load between the inner shaft member and the outer sleeve member; (g) an equilibrium chamber partially defined by the flexible layer and disposed on an other one of the axially opposite sides of the flexible partition, the equilibrium chamber being filled with the non compressible fluid and easily permitting volumetric change thereof; (h) an annular orifice defining member fixed to an inner circumferential surface of the outer sleeve member so as to at least partially define an orifice passage extending circumferentially along the inner surface of the outer sleeve member for permitting a fluid communication between the pressure-receiving chamber and the equilibrium chamber, wherein the flexible partition includes a cylindrical portion axially protruding from an inner peripheral portion of the orifice defining member toward the elastic body, and an annular curved portion curvedly extending radially inwardly from a protruding end portion of the cylindrical portion to the inner shaft member, and wherein the flexible partition fixed at an outer peripheral portion of the cylindrical portion to the orifice defining member, and at an inner peripheral portion of the annular curved portion to the inner shaft member.

According to the fluid-filled cylindrical vibration-damping device of this mode, the cylindrical portion of the flexible partition is formed protruding axially toward the pressure-receiving chamber, whereby the flexible partition is operable like a piston for the pressure-receiving chamber during application of the axial vibrational load to the device. In particular, when the outer sleeve member is displaced in the axial direction relative to the inner shaft member, the cylindrical portion of the flexible partition is forcedly pushed into the pressure-receiving chamber along with the outer sleeve member. As a result, the annular curved portion of the flexible partition is forcedly pushed into the pressure-receiving chamber in the axial direction of the device. This motion of the flexible partition causes effective fluid pressure variation in the pressure-receiving chamber during application of the axial vibrational load to the device, whereby a sufficiently large amount of fluid flows through the orifice passage can be caused based on fluid pressure differences between the pressure-receiving chamber an the equilibrium chamber. Thus, the fluid-filled cylindrical vibration-damping device of this mode is able to exhibit a highly advantageous damping effect on the basis of resonance or flows of the fluid through the orifice passage.

Further, the flexible partition is firmly fixed at its inner peripheral portion to the inner shaft member and at the outer peripheral portion to the outer sleeve member, so that a leakage of the fluid pressure at the connecting portion of the flexible partition to the inner shaft member to the outer sleeve member (in other words, a short of the orifice passage) is effectively prevented, making it possible for the vibration-damping device to exhibit an intended damping effect with high stability for a long period of time.

Yet further, the cylindrical portion of the flexible partition is configured to be a cylindrical shape so as not to expand into the pressure-receiving chamber in a radially outward direction, thereby ensuring a desired amount of volume of the pressure-receiving chamber. This makes it possible for the fluid-filled cylindrical vibration-damping device to exhibit the intended damping effect even when the input axial vibration has a relatively large amplitude.

(2) A fluid-filled cylindrical vibration-damping device according to the above indicted mode (1), further comprising: a rubber buffer disposed on an inner circumferential surface of the orifice defining member that is opposed to the inner shaft member in a radial direction perpendicular to an axial direction of the device, wherein the inner shaft member and the outer sleeve member are brought into abutting contact with each other via the rubber buffer, thereby providing a radial stopper mechanism for limiting an amount of displacement of the inner shaft member and the outer sleeve member relative to each other in the radial direction in a shock absorbing fashion. According to this mode, the radial stopper mechanism for limiting an radial displacement of the inner shaft member and the outer sleeve member relative to each other is provided by effectively utilizing the orifice defining member located at an axially intermediate portion of the outer sleeve member, while avoiding an enlargement in size of the device in its axial direction. Preferably, the rubber buffer may be integrally formed with the rubber partition.

(3) A fluid-filled cylindrical vibration-damping device according to the above-indicated mode (1) or (2), wherein the flexible partition is formed of a rubber partition whose expansion spring stiffness is smaller than that of the elastic body, while the flexible layer is formed of a flexible rubber layer whose expansion spring stiffness is smaller than that of the rubber partition. This arrangement makes it enable to further efficiently generate relative pressure variation between the pressure-receiving chamber and the equilibrium chamber, thus effectively ensuring a sufficient amount of flows of the fluid through the orifice passage. Accordingly, the fluid-filled cylindrical vibration-damping device of this mode is capable of exhibiting a further improved damping effect on the basis of flows of the fluid through the orifice passage. It should be appreciated that the expansion spring stiffness of the elastic body and the rubber partition are represented by an amount of pressure variation required for causing a given increment of volume of the pressure-receiving chamber, while the expansion spring stiffness of the flexible rubber layer is represented by an amount of pressure variation required for causing a given increment of volume of the equilibrium chamber. The expansion spring stiffness of each of the elastic body, the rubber partition and the flexible rubber layer can be tuned by changing its material, its thickness, its free length or other dimensions or shapes thereof.

(4) A fluid-filled cylindrical vibration-damping device according to any one of the above-indicated modes (1)–(3), wherein the inner shaft member includes a restricting member disposed on one of axially opposite end portion of the inner shaft member so as to extend radially outwardly, and an axially outer end portion of the elastic body is bonded to the restricting member over an area more than a radially inner half of the spacing between the inner shaft member and the outer sleeve member. This arrangement further facilitate elastic deformation of the elastic body due to an axial displacement of the inner shaft member and the outer sleeve member relative to each other during application of an axial vibrational load to the device, thereby generating fluid pressure variation in the pressure-receiving chamber more efficiently. Accordingly, the amount of fluid flows through the orifice passage can be obtained in a more efficient manner, making it enable for the vibration-damping device to exhibit a further improved damping effect on the basis of flows of the fluid through the orifice passage.

Preferably, the one axial end portion of the inner shaft member projects axially outwardly from the one axial end portion of the outer sleeve member, and the elastic body elastically connecting the one axial end portions of the inner shaft member and the outer sleeve member has an approximately tapered cylindrical shape extending radially inwardly in an axially outward direction thereof so that an axially outwardly protruding end face of the elastic body is bonded to the restricting member. According to this arrangement, the elastic body can be bonded to the restricting member over a generally entire area of the space between the inner shaft member and the outer sleeve member in the radial direction perpendicular to the axial direction of the device.

According to more preferred form of the above-indicated mode (4) of the invention, a flange portion is provided at an open end portion of the axial end portion of the outer sleeve member so as to extend in the radial direction perpendicular to the axial direction of the device, and so as to be opposed to the restricting member in the axial direction of the device, and a rubber buffer is disposed on at least one of the flange portion and the restricting member to project out therefrom, thereby providing an axial stopper mechanism for limiting an axial displacement of the inner shaft member and the outer sleeve member relative to each other in a shock absorbing fashion.

(5) A fluid-filled cylindrical vibration-damping device according to any one of the above-indicated mode (1)–(4), wherein an axially inner end face of the elastic body is shaped to be a tapered inclined face gradually extending radially inwardly in an axially outward direction from the outer sleeve member toward the inner shaft member. This arrangement is advantageous to provide a sufficient space between the flexible partition and the elastic body in an efficient manner, thus further effectively ensuring a desired volume of the pressure-receiving chamber, and accordingly avoiding interfere or undesirable contact between the pressure-receiving chamber and the flexible partition as a result of elastic deformation of the elastic body as well as the flexible partition due to a vibrational load or a static load applied to the vibration-damping device in its axial direction.

(6) A fluid-filled cylindrical vibration-damping device according to any one of the above-indicated modes (1)–(5), wherein the flexible layer is fixed at an outer peripheral portion thereof to the outer sleeve member at a first axial position, and at an inner peripheral portion thereof to the inner shaft member at a second axial position that is located axially outward of the first axial position so that the flexible layer protrudes axially outwardly from the outer sleeve member toward the inner shaft member. According to this mode of the invention, the flexible layer protrudes axially outwardly, thus making it possible to permit a sufficiently large free length of the flexible layer as well as a sufficiently large amount of volumetric change of the equilibrium chamber, without needing an enlargement of the outer sleeve in its radial and/or axial directions. This leads to an improved durability and an improved damping capability of the fluid-filled cylindrical vibration-damping device.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
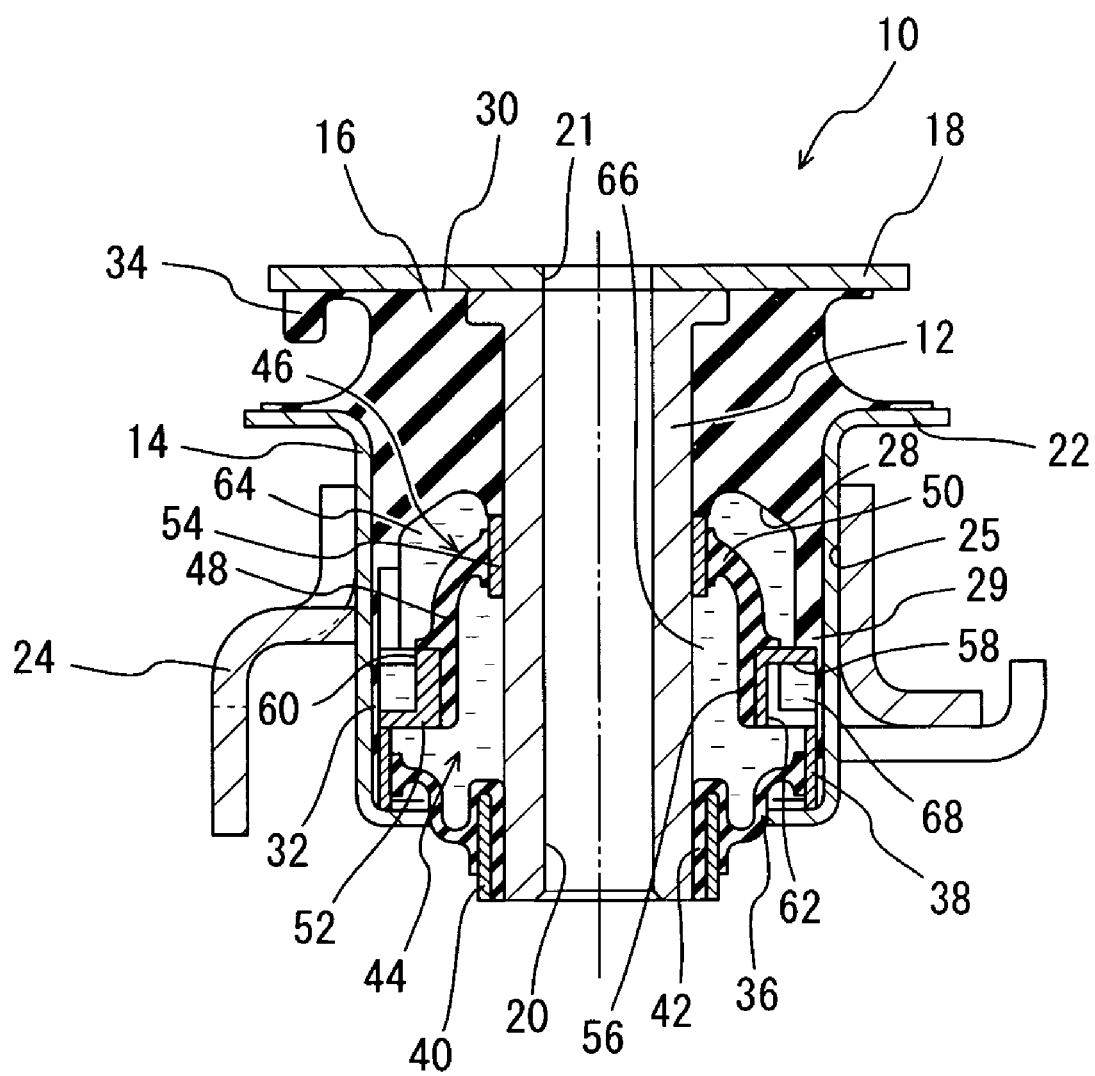
FIG. 1 is an elevational view in axial or vertical cross section of a fluid-filled vibration-damping device in the form of an engine mount for use in an automotive vehicle that is constructed according to one preferred embodiment of the invention, taken along line 1—1 of FIG. 2.
Figure 2:
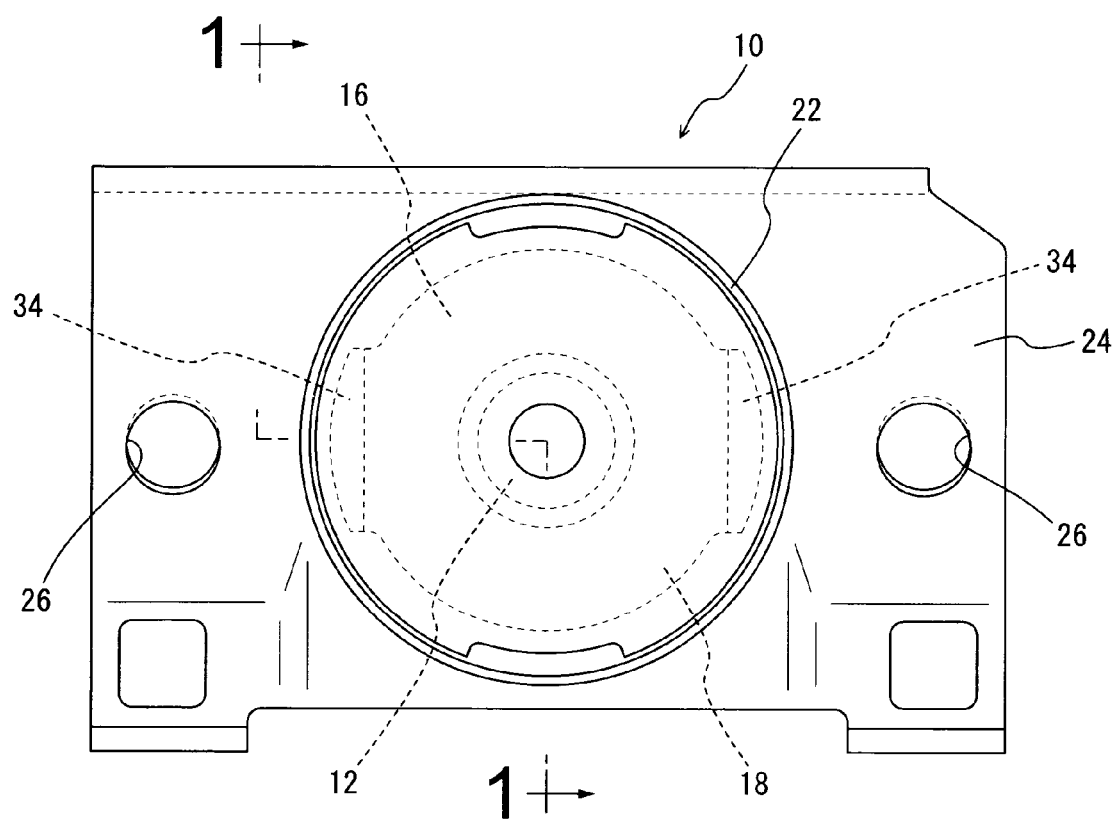
FIG. 2 is a top plane view of the engine mount of FIG. 1.
Figure 3:
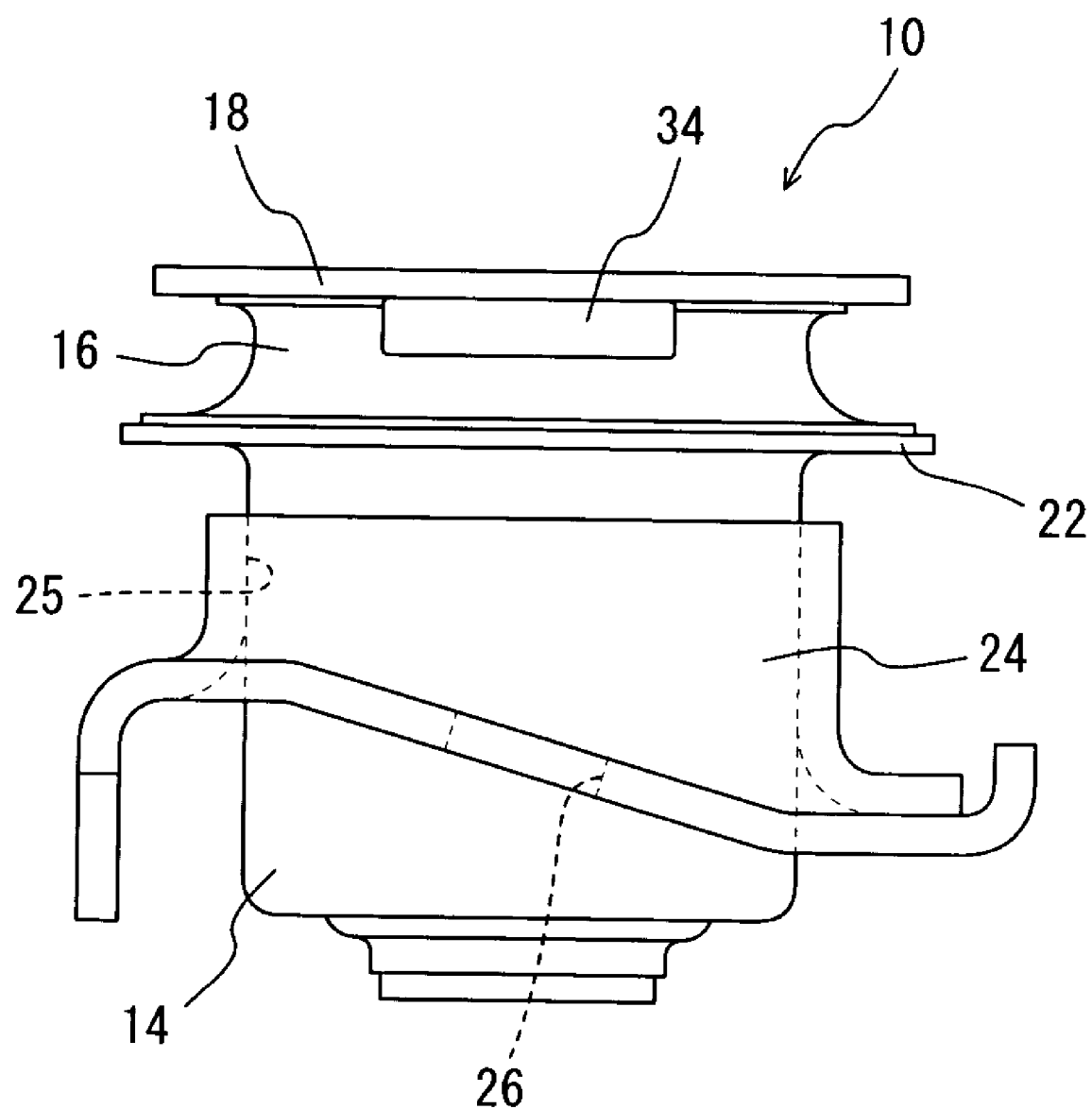
FIG. 3 is a left side elevational view of the engine mount of FIG. 2.

Referring to FIGS. 1–3, shown is a fluid-filled cylindrical vibration-damping device in the form of the engine mount 10 for use in an automotive vehicle, constructed according to a first embodiment of the present invention. The engine mount 10 includes: an inner shaft member in the form of a metallic inner sleeve 12; an outer sleeve member in the form of a metallic outer sleeve 14; and a rubber elastic body 16 interposed in between and elastically connecting the inner and outer sleeves 12, 14. The engine mount 10 is installed between a power unit and a body of the vehicle (not shown) for elastically mounting the power unit on the body in a vibration-damping fashion. In the following description, the vertical direction is basically equal to the vertical direction as seen in FIG. 1.

Described in detail, the inner sleeve 12 is an approximately straight thick-walled cylindrical member with a relatively small diameter. On an axially upper end portion of the inner sleeve 12, there is fixed a restricting member 18 of thick walled disk-like shape by welding or the like, such that the restricting member 18 is located in a concentric or coaxial relationship with the inner sleeve 12, and extends in a radially outward direction perpendicular to their axial direction. The restricting member 18 has a central hole 21 whose diameter is substantially identical with a central bore 20 of the inner sleeve 12. Both of the inner sleeve 12 and the restricting member 18 are made of a metallic material such as steel, and suitably dimensioned to exhibit a required rigidity. The inner sleeve constructed as described above is fixed to the power unit (not shown) of the vehicle by means of a mounting bolt extending through the central bore 20.

The outer sleeve 14, on the other hand, is an approximately straight cylindrical member having an inner diameter that is sufficiently larger than an outer diameter of the inner sleeve 12 and an axial dimension that is smaller than that of the inner sleeve 12. The outer sleeve 14 is disposed radially outwardly of the inner sleeve 12 in a coaxial relationship with each other. In this arrangement, the inner sleeve 12 and the outer sleeve 14 are radially opposed to each other with a spacing therebetween, and the outer sleeve 14 is located at an axially intermediate portion of the inner sleeve 12, whereby axially opposite end portions of the inner sleeve 12 project out from axially opposite end portions of the outer sleeve 14 by predetermined axial lengths, respectively. A flange portion 22 of annular shape is integrally formed at an axially upper open end portion of the outer sleeve 14 so as to extend radially outwardly. This flange portion 22 is opposed to the restricting member 18 of the inner sleeve 12 in the axial direction with a given axial distance therebetween.

The outer sleeve 14 is press-fitted into a fixing bore 25 formed through a central portion of a plate-like bracket member 24 made of metal so that the bracket member 24 is fixed to an axially intermediate portion of the outer sleeve 14 so as to extend radially outwardly. This bracket member 24 has a mounting hole 26, and the outer sleeve 14 is fixed to the body of the vehicle (not shown) by means of a mounting bolt extending through the mounting hole 26 of the bracket member 24.

The inner and outer sleeves 12, 14 disposed in a radially inner/outer relationship with each other, are elastically connected together via the elastic body 16 at their axially upper end portions. The elastic body 16 is configured to be a generally thick walled annular block member in its entirety. An inner circumferential surface of the elastic body 16 is bonded to an outer circumferential surface of the inner sleeve 12, and an outer circumferential surface of the elastic body 16 is bonded to an inner circumferential surface of the outer sleeve 14, in the process of vulcanization of a rubber material for forming the elastic body 16. Thus, the inner and outer sleeves 12, 14 and the elastic body 16 cooperate to provide an integral vulcanized product.

The axially lower end portion of the elastic body 16 is located between the inner and outer sleeve members 12, 14, and extending axially downwardly by a given axial length. The axially inner or lower end face of the elastic body is configured to be a tapered inner surface 28 extending radially inwardly from the outer sleeve member 14 toward the inner shaft member 12 in the axially upward direction as seen in FIG. 1. An elongated cylindrical rubber 29 is integrally formed with the elastic body 16 such that the elongated cylindrical rubber 29 extends axially downwardly by a given length from an outer peripheral portion of the axially lower end face of the elastic body 16, and is bonded to the inner circumferential surface of the outer sleeve 12 in the process of vulcanization of a rubber material for forming the elongated cylindrical rubber 29. On the axially lower side of the elongated cylindrical rubber 29, a thin-walled sealing rubber layer 32 is provided for coating a generally entire area of the inner circumferential surface of the outer sleeve 14 and bonded to the outer sleeve 14 during vulcanization of a rubber material for forming the sealing rubber layer 32.

On the other hand, the axially upper end portion of the elastic body 16 protrudes axially outwardly or upwardly from the upper open end portion of the outer sleeve 14, and a protruding end face 30 of the elastic body 16 is bonded by the above-described vulcanization to the restricting member 18. According to the present embodiment, the elastic body 16 extends over and bonded by the vulcanization to the flange portion 22 of the outer sleeve 14, and protrudes axially outwardly or upwardly from the flange portion 22 with a tapered outer circumferential surface. The axially upper end face, i.e., the protruding end face 30 of the elastic body 16 has a diameter approximately equal to the radial distance between the inner and outer sleeves 12, 14, and bonded by the vulcanization to the restricting member 18 over its entire area.

On an outer circumferential portion of the restricting member, provided are a pair of rubber buffers 34, 34, which are bonded at respective circumferential portions that are diametrically opposite to each other, and protrude axially downwardly. These rubber buffers 34, 34 are opposite to the flange portion 22 of the outer sleeve 14 with an axial spacing therebetween. When the inner sleeve 12 displaced axially downwardly relative to the outer sleeve 14, the rubber buffers 34, 34 are brought into abutting contact with the flange portion 22 of the restricting member 18, thereby functioning as an axial stopper mechanism to limit an amount of axial displacement of the inner and outer sleeves 12, 14 relative to each other in a shock absorbing fashion. As is understood from the aforesaid description, the integral vulcanized product including the elastic body 16 has a constant axial cross sectional shape over its entire circumference, except the portions where the pair of rubber buffers 34, 34 are formed.

On the side of axially lower end portions of the inner and outer sleeves 12, 14, provided is a flexible layer in the form of a flexible diaphragm 36. This flexible diaphragm 36 includes a cylindrical portion, an upper open-end portion extending radially outwardly, and an lower open-end portion extending radially inwardly with a clank-like cross sectional shape. The upper open-end portion of the flexible diaphragm 36 is bonded at its outer peripheral portion to an outer ring 38 in the process of vulcanization of a rubber material for forming a flexible diaphragm 36, and the lower open-end portion of the flexible diaphragm 36 is bonded at its inner peripheral portion to an inner ring 40 in the aforesaid vulcanization process. The outer ring 38 is forcedly pressed into a bore of the outer sleeve 14 from the axially lower end portion of the outer sleeve 14, and firmly fitted onto an axially lower end portion of the inner circumferential surface of the outer sleeve 14. The inner ring 40 is forcedly pressed onto the axially lower end portion of the inner sleeve 12, and firmly fitted onto an axially lower end portion of the outer circumferential surface of the inner sleeve 12. The flexible diaphragm 36, which is disposed between the inner and outer sleeves 12, 14 as described above, has a sufficient amount of slack, making it possible with ease for the flexible diaphragm 36 to ensure a sufficient amount of stroke of its elastic deformation. In the present embodiment, the outer ring 38 and the inner ring 40 are both made of a rigid material such as metal, and firmly fitted onto the outer and inner sleeves 14, 12 via the sealing rubber layer 32 and a sealing rubber layer 42 fixed onto an inner circumferential surface of the inner ring 40, respectively. Since these sealing rubber layers 32, 42, which are compressed by and between the outer sleeve 14 and the outer ring 38, and the inner sleeve 12 and the inner ring 40, thereby ensuring a fluid-tightness at portions where the outer ring 38 and the inner ring 40 are fitted onto the outer sleeve 14 and the inner sleeve 12, respectively.

That is, a hollow space defined between the outer circumferential surface of the inner sleeve 12 and the inner circumferential surface of the outer sleeve 14 is fluid-tightly closed by means of the elastic body 16 at its axially upper open-end portion, and by means of the flexible diaphragm 36 at its axially lower open-end portion. As a result, a fluid-filled area 44, which is fluid-tightly sealed off from the external area, is formed between a radial spacing between the inner and outer sleeves 12, 14 in a fluid-tight sealing. The fluid-filled area 44 is filled with a suitable non-compressible fluid such as water, alkylene glycol, polyalkylene glycol, silicone oil or the like. The filling of the fluid-filled area 44 with the non-compressible fluid can be effected by mounting the flexible diaphragm 36 onto the inner and outer sleeves 12, 14 within a mass of the non-compressible fluid, for example.

Within the fluid-tight area 44 defined between the elastic body 16 and the flexible diaphragm 36, housed is a flexible partition in the form of a rubber partition 46 by which the axially intermediate portions of the inner and outer sleeves 12, 14 are elastically connected together. The rubber partition 46 includes a cylindrical portion 48 straightly extending in the axial direction of the engine mount 10 and located in an approximately radially central portions of the radial spacing between the inner and outer sleeves 12, 14. The rubber partition 46 further includes an annular curved portion 50 smoothly connected to and integrally formed at an axially upper end portion of the cylindrical portion 48, while extending radially inwardly from the axially upper end portion of the cylindrical portion 48 with a curved or arc shape in cross section. The thus formed rubber partition 46 including the cylindrical portion 48 and the annular curved portion 50 has a generally constant cross sectional shape over its entire circumference.

The rubber partition 46 is bonded at an outer peripheral portion thereof, i.e., an axially lower end portion of the cylindrical portion 46 thereof to an annular orifice defining member in the form of an orifice metal member 52 in the process of vulcanization of a rubber material for forming the rubber partition 46, while being bonded at an inner peripheral portion thereof, i.e., an inner peripheral portion of the annular curved portion 50 located on the axially upper side of the cylindrical portion 46 to a metallic fixing sleeve member 54 of thin cylindrical shape in the above-mentioned vulcanization process. That is, the rubber partition 46, the orifice metal member 52 and the fixing sleeve member 54 cooperate to provide an integral vulcanized product.

More specifically described, the orifice metal member 52 has a constant rectangular shape in cross section over its entire circumference. Onto an inner peripheral portion of the orifice metal member 52, bonded is the axially lower end portion of the cylindrical portion 48 of the rubber partition 46 through the above-mentioned vulcanization, so that the cylindrical portion 48 of the rubber partition 46 projects axially upwardly from the inner peripheral portion of the orifice metal member 52. The inner circumferential surface of the orifice metal member 52 is entirely coated by the lower end portion of the cylindrical portion 48, thereby forming a rubber buffer 56 on the inner circumferential surface of the orifice metal member 52. The orifice metal member 52 includes an circumferential groove 58 extending circumferentially over a given circumferential distance. In the present embodiment, the circumferential groove 58 has a circumferential length that is approximately equal to a quarter of the circumference of the orifice metal member 52. This circumferential groove 58 is open in an outer circumferential surface of the orifice metal member 52. One of circumferentially opposite end portions of the circumferential groove 58 is open in the axially upper end face of the orifice metal member 52 through a communication hole 60 formed through an upper wall of the circumferential groove 58, while the other end portion of the circumferential groove 58 is open in the axially lower end face of the orifice metal member 52 through a communication hole 62 formed through a flower of the circumferential groove 58.

The fixing sleeve member 54 is forcedly press-fitted onto the inner sleeve 12 to be firmly fitted onto the axially intermediate portion of the inner sleeve 12 in a fluid-tight fashion. On the other hand, the orifice metal member 52 is forcedly press-fitted into the outer sleeve 14 to be firmly fitted onto the axially intermediate portion of the inner circumferential surface of the outer sleeve 14 in a fluid-tight fashion. In this arrangement, the rubber partition 46 housed within the fluid-filled area 44 is extending between the axially intermediate portions of the inner and outer sleeves 12, 14 so as to connect these inner and outer sleeves 12, 14, while dividing the fluid-filled area 44 into two parts located on axially opposite sides thereof, namely, a pressure-receiving chamber 64 partially defined by the elastic body 16 on the axially upper side of the rubber partition 46, and an equilibrium chamber partially defined by the flexible diaphragm 36 on the axially lower side of the rubber partition 46. In order to improve a fluid tightness of the pressure-receiving chamber 64 and the equilibrium chamber 66, the outer sleeve 14 may be preferably subjected to a drawing operation, after being assembled with the orifice metal member 52 and the outer ring 38 inserted thereinto, and before being assembled with the bracket member 24.

In the engine mount 10 constructed as described above, a vibrational load applied between the inner and outer sleeves 12, 14 is exerted on the pressure-receiving chamber 64, whereby fluid pressure variation is induced in the pressure-receiving chamber 64 due to elastic deformation of the elastic body 16. The equilibrium chamber 66, on the other hand, permits with ease its volumetric change based on elastic displacement or deformation of the flexible diaphragm 36, thereby rapidly absorbing a pressure change in the fluid filled therein. It should be appreciated that the rubber partition 46 has an expansion spring stiffness that is made sufficiently smaller than that of the elastic body 16, and that is made sufficiently larger than that of the flexible diaphragm 36. This arrangement is advantageously generate relative fluid pressure variation between the pressure-receiving chamber 64 and the equilibrium chamber 66.

The orifice metal member 52 is held in close contact at its outer circumferential surface with the inner circumferential surface of the outer sleeve 14, and the opening of the circumferential groove 58 is fluid tightly closed by the outer sleeve 14 over its entire length, whereby it is formed an orifice passage 68 permitting a fluid communication between the pressure-receiving chamber 64 and the equilibrium chamber 66, so as to extend circumferentially along the inner circumferential surface of the outer sleeve 14. In the event when a relative fluid pressure variation is induced between the pressure-receiving chamber 64 and the equilibrium chamber 66, flows of the fluid through the orifice passage 68 is induced between the pressure-receiving chamber 64 and the equilibrium chamber 66.

Additionally, the orifice metal member 52 is axially interposed between and gripped by the elongated cylindrical rubber 29 and the outer ring 38, so that the orifice metal member 52 is axially positioned relative to the axially intermediate portion of the outer sleeve 14. Further, the orifice metal member 52 protrudes radially inwardly form the inner circumferential surface of the outer sleeve 14 by a given radial length over its entire circumference, so that the inner peripheral portion of the orifice metal member 52 is located radially intermediate portion between the inner and outer sleeves 12, 14. Accordingly, the cylindrical portion 48 of the rubber partition 46 is positioned in the radially intermediate portion between the inner and outer sleeves 12, 14, and extending axially upwardly from the inner peripheral portion of the orifice metal member 52, without being contact with the inner and outer sleeves 12, 14. The axially upper end portion of the rubber partition 46 is curved radially inwardly before reaching the elastic body 16, so that the annular curved portion 50 of the rubber partition 46 is located not to contact with the elastic body 16. In the present embodiment, particularly, the axially lower end face of the elastic body 16 is shaped to provide the tapered inner surface 28. This arrangement permit that the elastic body 16 and the annular curved portion 50 are opposed to each other with an approximately constant spacing therebetween, making it possible to form the pressure-receiving chamber 64 between opposing surfaces of the elastic body 16 and the annular curved portion 50.

According to the engine mount 10 constructed as described above, the inner sleeve is fixed to the power unit side and the outer sleeve is fixed to the body side of the vehicle so that the engine mount 10 is installed on the vehicle with its central axis extends approximately in the vertical direction. The installed engine mount 10 cooperates with other several stalled engine mounts (not shown) to mount the power unit on the body of the vehicle in a vibration-damping fashion. The engine mount 10, which is installed in position as described above, is subjected to vibrations applied thereto approximately in its axial direction, so that the elastic body 16 is elastically deformed, and the inner and outer sleeves 12, 14 are accordingly displaced relative to each other. This causes relative fluid pressure variation between the pressure-receiving chamber 64 and the equilibrium chamber 66, repeatedly, thereby causing flows of the fluid through the orifice passages 68 as a result of the generated relative fluid pressure variation. Accordingly, a suitable tuning of the orifice passage 68 to a frequency band for vibrations to be damped allows the engine mount 10 to exhibit an excellent vibration-damping effect based on resonance or flows of the fluid through the orifice passage 68.

In the engine mount 10, the rubber partition 46 includes the cylindrical portion 48 extending axially upwardly from the orifice metal member 52 fixed to the outer sleeve 14 toward the pressure-receiving chamber 64, and the annular curved portion 50 is curvedly extending from the upper end portion of the cylindrical portion 48 to be fixed to the inner sleeve 12. This specific configuration of the rubber partition 46 permits that the rubber partition 46 functions or moves like a piston for the pressure-receiving chamber 64 during axial displacement of the inner and outer sleeves 12, 14 relative to each other, whereby the annular curved portion 50 is pushed axially upward and downward by the cylindrical portion 48.

That is, the engine mount 10 is capable of efficiently exhibiting relative pressure variation between the pressure-receiving chamber 64 and the equilibrium chamber 66 on the basis of the above-described piston-like motion of the rubber partition 46, thus effectively ensuring a sufficient amount of fluid flows through the orifice passage 68 as a result of a relatively large fluid pressure difference between the pressure-receiving chamber 64 and the equilibrium chamber 66. Accordingly, the engine mount 10 can exhibit a high damping effect on the basis of flows of the fluid.

Further, the protruding end face 30 of the elastic body 16 is bonded to the restricting member 18 fixed to the inner sleeve 12 over its entire radial area located between the inner and outer sleeves 12, 14. This arrangement effectively facilitates elastic deformations of the elastic body 16 during application of vibration between the inner and outer sleeves 12, 14, thereby effectively increasing fluid pressure variation generated in the pressure-receiving chamber 64 and a resultant amount of fluid flows through the orifice passage 68. Thus, the engine mount 10 of this embodiment can exhibit further improved damping capacity on the basis of the increased amount of fluid flows through the orifice passage 68.

Yet further, the rubber partition 46 is disposed so as to extend with the aforesaid specific configuration generally corresponding to that of an outer circumferential inner surface of the pressure-receiving chamber 64 defined by the outer sleeve 14 and the elastic body 16, so that the rubber partition 46 cooperates with the outer sleeve 14 and the elastic body 16 to form therebetween the pressure-receiving chamber 64 extending with an approximately constant width dimension. This arrangement ensures a sufficient volume of the pressure-receiving chamber 64, making it possible to exhibit stable damping effect with respect to vibration of relatively large amplitude, while avoiding interfere between the rubber partition 46 and other components housed in the engine mount 10 during relative displacement between the inner and outer sleeves 12, 14 of large amount. Therefore, the engine mount 10 has excellent durability or life expectancy, also.

In addition, the part of the rubber partition 46 bonded by the above-mentioned vulcanization on the inner circumferential surface of the orifice metal member 52, is effectively utilized to provide the rubber buffer 56 for covering an area of the orifice metal member 52 opposing to the inner sleeve 12 in the radial direction. In this arrangement, the orifice metal member 52 is brought into abutting contact with the inner sleeve 12 via the rubber buffer 56, thereby advantageously providing a radial stopper mechanism for limiting an amount of relative displacement between the inner and outer sleeves 12, 14 in a shock absorbing fashion, with a reduced number of components. Moreover, since this radial stopper mechanism can be formed within the fluid-filled area 44, thereby avoiding or minimizing an enlargement in size of the engine mount 10 in its axial direction, effectively.

While the presently preferred embodiment of this invention has been described in detail for illustrative purpose only, it is to be understood that the present invention is not limited to the details of the illustrated embodiments, but may be embodied with various changes, modifications and improvements, which may occur to those skilled in the art, without departing from the spirit and scope of the invention defined in the following claims.

For instance, while the restricting member 18 is bonded to the protruding end face 30 of the elastic body 16 in the illustrated embodiment, the restricting member 18 is not essential but optional to practice the present invention. Therefore, it is possible to realize the present invention without employing the restricting member 18 while permitting the entire area of the protruding end face 30 of the elastic body 16 to be a free surface, like in the engine mounts disclosed in JP-U-6-22642 and JP-A-8-170686.

The specific structure, configuration, length, cross sectional area or other dimensions of the orifice passage 68 may be desirably changed in view of required damping characteristics of the engine mount. For instance, it may be possible to provide one or a plurality of orifice passages each extending through the orifice metal member 52, or alternatively to provide an orifice passage defined by and between the inner sleeve 12 and the fixing sleeve member 54 and extending along the outer circumferential surface of the inner sleeve 12.

It should also be noted that the principle of the present invention may be applicable to a variety of vehicle mounts including body mounts, member mounts, carburetor mounts, and strut bar cushions, other than engine mounts, or to various fluid-filled cylindrical vibration-damping devices other than those provided on the motor vehicle.

What is claimed is:

1. A fluid-filled cylindrical vibration-damping device comprising:

an inner shaft member;

an outer sleeve member disposed radially outwardly of said inner shaft member with a spacing therebetween;

an elastic body disposed between and elastically connecting a first axial end portion of said inner shaft member and a first axial end portion of said outer sleeve member;
a flexible layer disposed between and elastically connecting a second axial end portion of said inner shaft member and a second axial end portion of said outer sleeve member;
a flexible partition disposed between and elastically connecting axially intermediate portions of said inner shaft member and said outer sleeve member;
a pressure-receiving chamber partially defined by said elastic body and disposed on one of axially opposite sides of said flexible partition, said pressure-receiving chamber being filled with a non-compressible fluid whose pressure varies upon application of an axial vibrational load between said inner shaft member and said outer sleeve member;
an equilibrium chamber partially defined by said flexible layer and disposed on an other one of said axially opposite sides of said flexible partition, said equilibrium chamber being filled with said non compressible fluid and easily permitting volumetric change thereof;
an annular orifice defining member fixed to an inner circumferential surface of said outer sleeve member so as to at least partially define an orifice passage extending circumferentially along said inner surface of said outer sleeve member for permitting a fluid communication between said pressure-receiving chamber and said equilibrium chamber,
wherein said flexible partition includes a cylindrical portion axially protruding from an inner peripheral portion of said orifice defining member toward said elastic body, and an annular curved portion curvedly extending radially inwardly from a protruding end portion of said cylindrical portion to said inner shaft member,
wherein an outer peripheral portion of said cylindrical portion of said flexible partition is fixed to said orifice defining member, and an inner peripheral portion of said annular curved portion of said flexible partition is fixed to said inner shaft member, and
wherein the device further comprises: a rubber buffer disposed on an inner circumferential surface of said orifice defining member that is opposed to said inner shaft member in a radial direction perpendicular to an axial direction of said device, wherein said inner shaft member and said outer sleeve member are brought into abutting contact with each other via said rubber buffer, thereby providing a radial stopper mechanism for limiting an amount of displacement of said inner shaft member and said outer sleeve member relative to each other in said radial direction in a shock absorbing fashion.

2. A fluid-filled cylindrical vibration-damping device according to claim 1, wherein said inner shaft member includes a restricting member disposed on said first axial end portion of said inner shaft member so as to extend radially outwardly, and a protruding end face of said elastic body is bonded to said restricting member over an area more than a radially inner half of said spacing between said inner shaft member and said outer sleeve member.

3. A fluid-filled cylindrical vibration-damping device according to claim 2, wherein said first axial end portion of said inner shaft member projects axially outwardly from said first axial end portion of the outer sleeve member, and said elastic body elastically connecting said first axial end portion of said inner shaft member and said first axial end portion of said outer sleeve member has an approximately tapered cylindrical shape extending radially inwardly in an axially outward direction thereof so that an axially outwardly protruding end face of said elastic body is bonded to said restricting member.

4. A fluid-filled cylindrical vibration-damping device according to claim 2, wherein a flange portion is provided at an open end portion of said first axial end portion of said outer sleeve member so as to extend in an radial direction perpendicular to an axial direction of said device, and so as to be opposed to said restricting member in said axial direction of said device, and a rubber buffer is disposed on at least one of said flange portion and said restricting member to project out therefrom, thereby providing an axial stopper mechanism for limiting an axial displacement of said inner shaft member and said outer sleeve member relative to each other in a shock absorbing fashion.

5. A fluid-filled cylindrical vibration-damping device according to claim 1, wherein said inner peripheral portion of said orifice defining member is located in a radially intermediate portion between said inner shaft member and said outer sleeve member, and said cylindrical portion of said flexible partition axially extending toward said elastic body without being connected with said inner shaft member and said outer sleeve member, and said annular curved portion is curved radially inwardly before reaching said elastic body.

6. A fluid-filled cylindrical vibration-damping device according to claim 5, wherein said flexible partition is disposed so as to extend with a configuration generally corresponding to that of an outer circumferential inner surface of said pressure-receiving chamber defined by said outer sleeve member and said elastic body so that said flexible partition cooperate with said outer sleeve member and said elastic body to form therebetween said pressure-receiving chamber extending with an approximately constant width dimension.

7. A fluid-filled cylindrical vibration-damping device according to claim 1, wherein an axially inner end face of said elastic body is shaped to be a tapered inclined face gradually extending radially inwardly in an axially outward direction from said outer sleeve member toward said inner shaft member.

8. A fluid-filled cylindrical vibration-damping device according to claim 1, wherein said flexible layer is fixed at an outer peripheral portion thereof to said outer sleeve member at a first axial position, and at an inner peripheral portion thereof to said inner shaft member at a second axial position tat is located axially outward of said first axial position so that said flexible layer protrudes axially outwardly from said outer sleeve member toward said inner shalt member.

9. A fluid-filled cylindrical vibration-damping device according to claim 1, wherein said flexible partition is formed of a rubber partition whose expansion spring stiffness is smaller than that of said elastic body, while said flexible layer is formed of a rubber layer whose expansion spring stiffness is smaller than that of said rubber partition.

* * * * *